Jan. 20, 1953  C. R. BRADSHAW  2,626,068
UNLOADING MECHANISM FOR FARM WAGONS
Filed Oct. 13, 1949
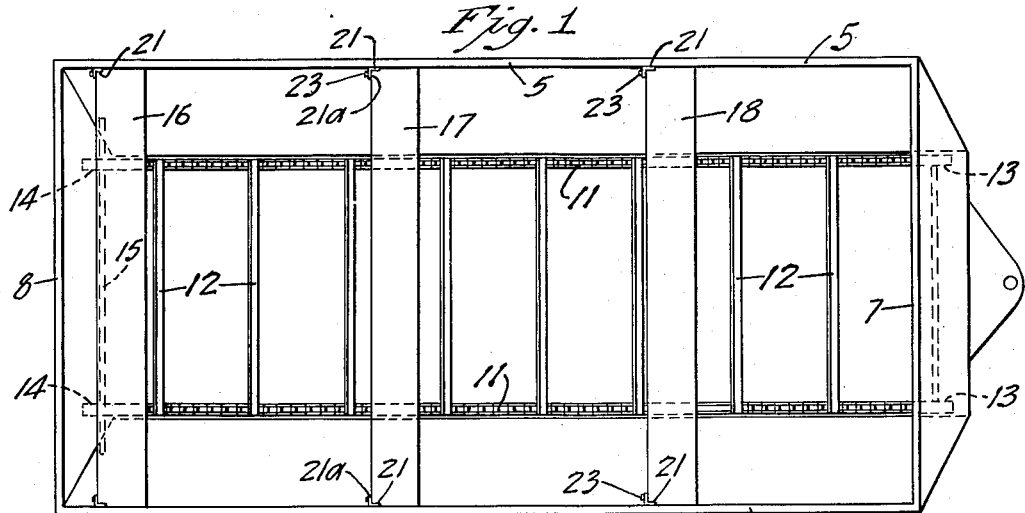
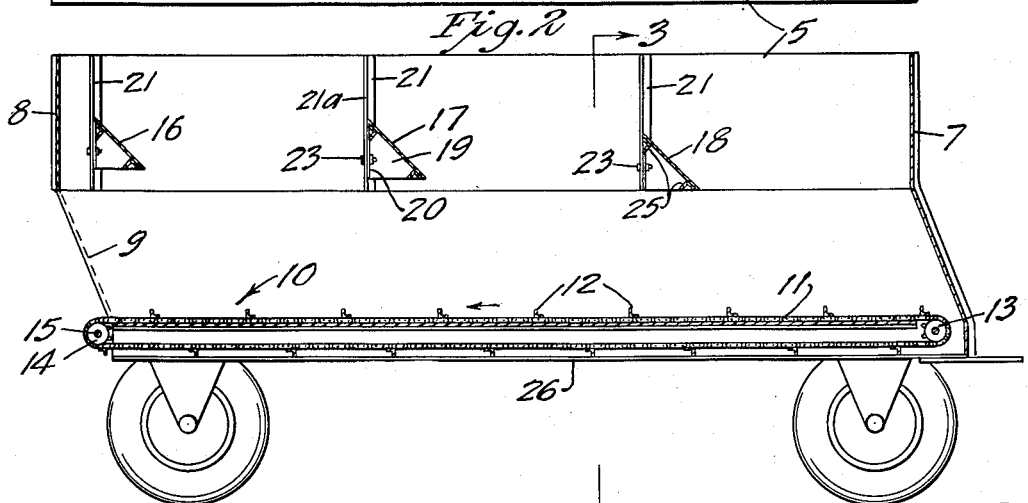
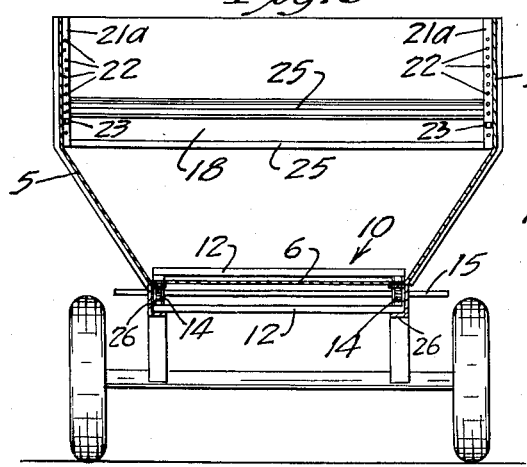
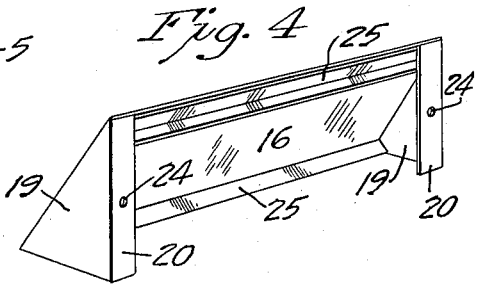
Inventor
Clifford R. Bradshaw
By John E. Stryker
Attorney Patented Jan. 20, 1953

2,626,068

UNITED STATES PATENT OFFICE 2,626,068

UNLOADING MECHANISM FOR FARM WAGONS

Clifford R. Bradshaw, Rock Elm, Wis.

Application October 13, 1949, Serial No. 121,210

1 Claim. (Cl. 214—83.36)

This invention relates to farm wagons adapted to carry chopped material, e. g. chopped hay, straw or ensilage in either green or dry condition, and particularly to a wagon provided with material unloading mechanism and means for automatically regulating and controlling the rate of discharge of the material from the wagon.

According to present day farm practice, much hay, straw and ensilage is run through chopping machines in the field, and thereby reduced to short pieces ranging from a fraction of an inch to several inches in length. This chopped material is then transported to the farmyard in suitable wagons, from which it is unloaded and conveyed by mechanical means, such as a power driven conveyor or blower, which, in turn, delivers the material to a barn loft, silo or other storage building or stack. By the use of the present invention, the unloading of wagons containing the chopped material is greatly facilitated and a conveyor or blower for carrying the material to the place of storage may be fed at a controlled rate directly from the wagon, with a minimum of manual labor.

It is an object of my invention to provide for a wagon having an unloading conveyor, novel material retarding and controlling mechanism whereby, when the conveyor is operated, the load of chopped material is discharged from the wagon gradually and at a controlled rate, rather than as a large irregular mass.

A particular object is to provide for a wagon having a conveyor extending along its floor or bottom, a plurality of baffle members arranged to partially relieve the conveyor of the pressure created by the overlying load of chopped material, and to control the rate of discharge of the material carried by the conveyor.

Further objects are to adapt a wagon of the class described to carry unusually large and heavy loads of chopped material, to minimize the manual labor required in the discharge of such loads from the wagon, and to effectively guard against the overloading of the wagon conveyor during the unloading operation.

The invention also includes certain other novel features of construction which will be more fully pointed out in the following specification and claim.

Referring to the accompanying drawing, which illustrates, by way of example and not for the purpose of limitation, a preferred embodiment of my invention:

Figure 1 is a top plan view showing my unloading mechanism mounted on a wagon of suitable construction;

Fig. 2 is the central longitudinal sectional view through the wagon body and my improved unloading mechanism, the running gear or wheel support for the wagon being shown diagrammatically;

Fig. 3 is a cross sectional view through the wagon body taken on the line 3—3 of Fig. 2; and Fig. 4 is a perspective view showing one of the baffles and supporting brackets therefor.

In the drawing, the wagon body is shown as having side walls 5, the lower portions of which converge downwardly to a bottom or floor 6. The wagon also has a front end wall 7 and a rear end wall or tail gate 8. The tail gate has upper and lower removable panels so that when the lower panel is removed an opening 9 is afforded through which the material contained in the wagon may be discharged by operation of a conveyor indicated generally by the numeral 10. This conveyor is of the common type having a pair of parallel endless chains 11, connected at suitable intervals by cross bars 12, and operating on sprocket wheels 13 and 14. The sprocket wheels are fixed on supporting shafts and the rear shaft 15 has ends which project at each side of the wagon to be connected to suitable power driving mechanism (not shown). The wagon body is supported on wheels and provided with draft mechanism for connection to a tractor or draft animals.

Extending across the wagon above the conveyor 10 and below the upper edges of the walls 5 are inclined baffles severally indicated by the numerals 16, 17 and 18. Since these baffles are of identical construction a description of one of them will be sufficient. Each baffle comprises a long and relatively narrow flat plate supported at each end on a triangular bracket 19 having a vertically disposed flange 20 adapted to be fastened at any desired elevation to an angle bar 21 extending vertically and fixed on one of the walls 5 of the wagon. Each angle bar 21 has a flange 21a which projects perpendicularly to the wall 5 and is formed with a multiplicity of spaced perforations 22 severally adapted to receive a bolt 23 for fastening an end of one of the baffles to the wagon. As shown in Fig. 4, each of the flanges 20 has a perforation 24 to receive a bolt 23, and each baffle is reinforced by longitudinally extended angle bars 25. The several baffles are thus supported at an incline of approximately 45 degress to the vertical and with their upper edges rearwardly of their respective lower edges.

As shown in Fig. 2, the baffle 16 is positioned at a slightly higher elevation than the baffle 17, and the latter at a slightly higher elevation than the baffle 18. These baffles are spaced apart longitudinally of the wagon at approximately equal distances and the rear baffle 16 is located above and somewhat forwardly of the rear end of the conveyor 10. By this arrangement of baffles, I divide the body of the wagon into three compartments of approximately the same size or capacity.

Each of the conveyor chains 11 is supported on a channel-shaped beam 26 extending longitudinally of the wagon bottom and these beams also afford supports for the floor 6. The upper reaches of the chains are slidably supported on the floor 6, and the lower reaches of the chains and cross bars 12 carried thereby are supported on the lower flanges of the beams 26.

In use, the tail gate of the wagon is closed at the opening 9 when the wagon is to be filled with the chopped material. A large load of the material may be charged into the wagon at the top in the usual manner and the wagon may be filled to an elevation as high or higher than the several walls, in some cases the sides being built up by attaching auxiliary wall members at the top to afford maximum capacity. The loaded wagon is moved to the location where it is to be unloaded and the lower tail gate panel is opened to provide the discharge opening 9. By suitable driving connection with a tractor or other motor, the shaft 15 of the conveyor 10 is driven so that the conveyor bars 12 are operated to discharge the chopped material through the opening 9.

During the unloading operation, the baffles 16, 17 and 18 partially relieve the conveyor 10 from the weight of the overlying load of material, and, as the conveyor moves in the direction indicated by an arrow in Fig. 2, the inclined baffles tend to lift as well as retard the upper portion of the load as the lower portion thereof is carried toward the opening 9. By reason of my arrangement of the baffles at progressively higher elevations toward the discharge end of the conveyor, the front end compartment between the baffle 18 and end wall 7 is unloaded first, the material therefrom being carried out through the opening 9 gradually and at a substantially uniform rate. This is followed by the emptying of the compartment between the baffles 17 and 18, and thereafter the emptying of the rear end comparment between the baffles 16 and 17. Ordinarily, with proper adjustment of the baffles, no hand work is required to control and maintain the desired gradual and uniform rate of unloading of the chopped material carried in the wagon.

The elevation of the several baffles above the conveyor may be adjusted to obtain any desired rate of discharge of the material. Thus the several baffles 16, 17 and 18 may be secured at any desired elevation on their supporting angle bars 21 by suitable location of the connecting bolts 23 in the appropriate perforations 22. The height of the baffles may also be adjusted to compensate for the condition of the material contained in the wagon with respect to its moisture content and general tendency to pack or flow freely. Ordinarily, the wagon is arranged to discharge the chopped material through the opening 9 upon a conveyor arranged to feed a suitable blower for carrying the material to the place of storage.

Having described my invention, what I claim as new and desire to protect by Letters Patent, is:

For a wagon having side and end walls and a floor, one of said end walls having a removable member providing an opening through which material carried in the wagon may be discharged, the combination with a conveyor extending along the floor of said wagon to discharge material through said opening, a plurality of baffle plates extending across and above said conveyor in spaced relation one to another intermediate its ends, said baffle plates being inclined with their upper edges disposed rearwardly of their respective lower edges and means adjustably connecting the ends of said baffle plates to the side walls of the wagon at selected elevations such that the lower edge of a baffle plate near the discharge end of the conveyor is at a higher elevation than the lower edge of a plate toward the front end of the conveyor.

CLIFFORD R. BRADSHAW.

REFERENCES CITED

The following references are of record in the file of this patent:

UNITED STATES PATENTS

| Number | Name | Date |
|--------|------|------|
| 1,403,084 | James | Jan. 10, 1922 |
| 1,547,686 | Rieff | July 28, 1925 |
| 1,752,549 | Beardsley et al. | Apr. 1, 1930 |
| 1,755,120 | Kerr | Apr. 15, 1930 |
| 2,107,682 | Wall | Feb. 8, 1938 |
| 2,284,853 | Wall | June 2, 1942 |
| 2,496,463 | Gaddis | Feb. 7, 1950 |